United States Patent
Tang et al.

(10) Patent No.: US 12,192,042 B2
(45) Date of Patent: Jan. 7, 2025

(54) WIRELESS COMMUNICATION METHOD AND APPARATUS

(71) Applicant: HUAWEI TECHNOLOGIES CO., LTD., Guangdong (CN)

(72) Inventors: Hao Tang, Ottawa (CA); Zhang Zhang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 13 days.

(21) Appl. No.: 18/160,191

(22) Filed: Jan. 26, 2023

(65) Prior Publication Data
US 2023/0171144 A1 Jun. 1, 2023

Related U.S. Application Data

(63) Continuation of application No. PCT/CN2021/108692, filed on Jul. 27, 2021.

(30) Foreign Application Priority Data

Jul. 30, 2020 (CN) .......................... 202010754102.8

(51) Int. Cl.
H04L 27/34 (2006.01)

(52) U.S. Cl.
CPC ................................ H04L 27/3483 (2013.01)

(58) Field of Classification Search
CPC .................................................. H04L 27/3483
See application file for complete search history.

(56) References Cited

U.S. PATENT DOCUMENTS

| 8,787,428 | B2* | 7/2014 | Dai ....................... H04L 1/0077 375/211 |
| 2011/0044379 | A1 | 2/2011 | Lilleberg et al. |
| 2022/0294498 | A1* | 9/2022 | Shibata ................ H04B 7/0426 |

FOREIGN PATENT DOCUMENTS

| CN | 105409260 A | 3/2016 |
| CN | 111245560 A | 6/2020 |
| CN | 111953459 A | 11/2020 |

OTHER PUBLICATIONS

3GPP TS 38.213 V16.2.0, "3rd Generation Partnership Project, Technical Specification Group Radio Access Network, NR, Physical layer procedures for control (Release 16)," Jun. 2020, 176 pages.
3GPP TS 38.214 V15.7.0, "3rd Generation Partnership Project, Technical Specification Group Radio Access Network, NR, Physical layer procedures for data (Release 15)," Sep. 2019, 106 pages.
International Search Report and Written Opinion in International Appln. No. PCT/CN2021/108692, mailed on Oct. 19, 2021, 25 pages (with English translation).

* cited by examiner

*Primary Examiner* — Janice N Tieu
(74) *Attorney, Agent, or Firm* — Fish & Richardson P.C.

(57) ABSTRACT

Example wireless communication methods and apparatus are described. In one example method, a relay device receives a first signal sent by a first device, where the first signal carries a plurality of bits. The relay device decodes the first signal to determine first information corresponding to each of a plurality of first bits. The first information corresponding to each first bit is determined based on a probability that the first bit is 1 and a probability that the first bit is 0. The relay device sends the first information in a second signal to a second device, so that the second device can use the first information to decode the first signal.

18 Claims, 8 Drawing Sheets

WIRELESS COMMUNICATION METHOD AND APPARATUS

CROSS-REFERENCE TO RELATED APPLICATIONS

This application is a continuation of International Application No. PCT/CN2021/108692, filed on Jul. 27, 2021, which claims priority to Chinese Patent Application No. 202010754102.8, filed on Jul. 30, 2020. The disclosures of the aforementioned applications are hereby incorporated by reference in their entireties.

TECHNICAL FIELD

Embodiments of this application relate to the communication field, more specifically, to a wireless communication method and apparatus, and in particular, to a relay communication method and apparatus.

BACKGROUND

Mobile communication has greatly changed people's lives, but people are still in pursuit of mobile communication with better performance. A 5th generation mobile communication (5G) system emerges to cope with future explosive growth of mobile data traffic, massive device connections, and continuous emergence of various new services and application scenarios.

With enrichment of 5G application scenarios, in some scenarios with limited coverage, such as dense urban areas, high-frequency small cells, and Internet of vehicles, one or more relay nodes need to be introduced between a sending node and a destination receiving node to receive and forward a signal, so as to ensure signal transmission integrity.

In an existing relay technology, after receiving a signal, a relay node demodulates and decodes the signal, and determines, depending on whether correct decoding is performed, whether to perform forwarding. To be specific, the relay node re-encodes and modulates decoded data only after correct decoding is performed, and finally sends re-encoded and modulated data to the receiving device. Because forwarding is performed only after correct decoding is performed, the existing relay technology cannot meet a low latency requirement of a service, and is not applicable to a case in which channel quality of a relay node is poor.

How to reduce a communication latency and a requirement on channel quality while ensuring communication reliability and accuracy has become an urgent problem to be resolved in a relay technology.

SUMMARY

This application provides a wireless communication method and apparatus, to reduce a relay communication latency and a requirement of relay communication on channel quality.

According to a first aspect, a wireless communication method is provided. The method includes: A relay device receives a first signal sent by a first device, where the first signal carries a plurality of bits. The relay device decodes the first signal, to determine first information corresponding to each of a plurality of first bits, where the first information corresponding to each first bit is determined based on a probability that the first bit is 1 and a probability that the first bit is 0, and the first bits include a part or all of the plurality of bits carried in the first signal. The relay device sends a second signal to a second device, where the second signal carries the first information.

According to the solution of this application, the relay device demodulates and decodes the first signal received from the first device; determines soft information (namely, the first information) corresponding to a part or all bits in the signal. Soft information of each bit indicates a probability that the bit is "1", or soft information of each bit indicates a probability that the bit is "0"; and send the soft information to the second device of the signal. In this case, the second device can use the soft information to decode the first signal. This can improve a decoding success rate of the second device. In other words, according to the solution of this application, the soft information used by the second device to perform decoding may still be forwarded even if the relay device fails in decoding. This can reduce a communication latency and a requirement on channel quality while ensuring communication reliability and accuracy.

The first device may include a previous-hop device of the relay device in relay communication.

For example, the first device may include a source device for relay communication, or the first device may be a relay node.

In addition, the second device may include a next-hop device of the relay device in relay communication.

For example, the second device may include a destination device for relay communication, or the second device may be a relay node.

In this application, that "the first information corresponding to each first bit is determined based on a probability that the first bit is 1 and a probability that the first bit is 0" may be understood as: The first information corresponding to each first bit indicates a probability that the first bit is "1"; and/or the first information corresponding to each first bit indicates a probability that the first bit is "0".

In this application, the relay device demodulates and decodes the received first signal. To be specific, the plurality of bits carried in the first signal may include a correctly decoded (or successfully decoded) bit, and may further include an incorrectly decoded (or unsuccessfully decoded) bit.

In an implementation, the first bits include a bit that is incorrectly decoded by the relay device and that is in the plurality of bits carried in the first signal.

In addition, in this case, the method further includes: The relay device sends a third signal to the second device. The third signal carries a plurality of second bits, and the second bits include a correctly decoded bit in the plurality of bits carried in the first signal.

In an implementation, the first information and the second bits are sent in a cascading manner.

In other words, the second signal and the third signal are sent in a cascading manner.

That "the first information and the second bits are sent in a cascading manner" may be understood as that the relay device sends the first information and the second bits based on resources indicated by same scheduling information.

Alternatively, that "the first information and the second bits are sent in a cascading manner" may be understood as that the first information and the second bits are sent in a same time unit.

By way of example but not limitation, a time unit may include, but is not limited to, a time period, a scheduling period, a sending opportunity (specifically, a time period corresponding to a sending opportunity), and a transmission time interval (TTI), a slot group (including at least one slot), a symbol group (including at least one symbol), and the like.

Optionally, the method further includes: The relay device receives third indication information sent by the network device. The third indication information indicates a sequence of sending the first information and the second bits.

The third indication information may include higher layer signaling, for example, radio resource control (RRC) signaling.

Alternatively, the third indication information may include scheduling information, for example, downlink control information (DCI).

Alternatively, the sequence of sending the first information and the second bits may be specified by a communication system or a communication protocol.

Alternatively, the sequence of sending the first information and the second bits may be determined by the relay device and the second device through negotiation.

In another implementation, the first information and the second bits are sent through time division multiplexing or frequency division multiplexing.

Optionally, the method further includes: The relay device receives fourth indication information sent by the network device. The fourth indication information indicates a plurality of resources, and the plurality of resources one-to-one correspond to the plurality of bits carried in the first signal. That the relay device sends a second signal to a second device includes: The relay device sends, to the second device on a resource corresponding to each first bit, the first information corresponding to the first bit.

Specifically, the network device may allocate a plurality of first resources and a plurality of second resources to the relay device and the second device.

In an implementation, a quantity of first resources may be the same as a quantity of second resources, and a size of a first resource may be the same as a size of a second resource.

The second resource is used for transmission, of second bits in the plurality of bits carried in the first signal, between the relay device and the second device. The second bits include a part or all of the plurality of bits carried in the first signal. For example, the second bits include a successfully decoded bit in the plurality of bits carried in the first signal.

A quantity (or a size) of second resources may correspond to a quantity of the plurality of bits carried in the first signal.

The first resource is used for transmission of the first information between the relay device and the second device.

In this application, the plurality of first resources one-to-one correspond to the plurality of second resources. It is assumed that a first resource #1 is used to carry a bit (denoted as a bit #1) in the second signal. In this case, when decoding of the bit #1 fails, first information corresponding to the bit #1 (denoted as first information #1) is carried on a second resource corresponding to the first resource #1.

In an implementation, the first bits include all of the plurality of bits carried in the first signal.

In this application, that "the relay device sends a second signal to a second device" may be understood as: The relay device modulates the first information, maps a symbol obtained through modulation to a constellation point, and sends the symbol.

By way of example but not limitation, the following Manner 1 or Manner 2 may be used to perform the foregoing modulation and mapping.

Manner 1

To be specific, that the relay device sends a second signal to a second device includes: The relay device quantizes the first information based on a first quantization level; the relay device modulates quantized first information based on a first modulation scheme, to generate a first symbol; and the relay device maps the first symbol to a constellation point based on a second modulation scheme, and sends the first symbol. The second signal includes the first symbol; the second modulation scheme corresponds to quality of a channel between the relay device and the second device; and a first constellation diagram and a second constellation diagram include a same quantity of constellation points, the first constellation diagram is a constellation diagram corresponding to the first quantization level and the first modulation scheme, and the second constellation diagram is a constellation diagram corresponding to the second modulation scheme.

The solution of this application can reduce possible positions of constellation points in a constellation diagram (namely, the second constellation diagram) corresponding to the second signal. This helps the second device perform noise reduction on the second signal, to further improve effect and practicability of this application.

The second modulation scheme may also be understood as a modulation scheme used when the relay device and the second device transmit the second bit. In other words, the third signal may be generated after the second bit is modulated based on the second modulation scheme.

In this application, that "the relay device maps the first symbol to a constellation point based on a second modulation scheme, and sends the first symbol" may be understood as: The relay device maps, according to a first mapping rule, the first symbol (or a corresponding constellation point of the first symbol in the first constellation diagram) to a constellation point in the second constellation diagram, and sends the first symbol.

The first mapping rule may be specified by a communication system or a communication protocol, the first mapping rule may be indicated by the network device, or the first mapping rule may be determined by the relay device and the second device through negotiation. This is not particularly limited in this application, provided that the relay device and the second device have a same understanding and knowledge of the first mapping rule.

In an implementation, the first modulation scheme may be indicated by the network device. To be specific, the method further includes: The relay device receives first indication information sent by the network device. The first indication information indicates the first modulation scheme.

In another implementation, the first modulation scheme may be specified by a communication system or a communication protocol.

In still another implementation, the first modulation scheme may be determined by the relay device and the second device through negotiation.

Similarly, in an implementation, the first quantization level may be indicated by the network device. To be specific, the method further includes: The relay device receives second indication information sent by the network device. The second indication information indicates the first quantization level.

In another implementation, the first quantization level may be specified by a communication system or a communication protocol.

In still another implementation, the first quantization level may be determined by the relay device and the second device through negotiation.

As described above, the quantity of constellation points included in the first constellation diagram is the same as that included in the second constellation diagram, and the quantity of constellation points included in the first constellation diagram is determined by the first quantization level and the first modulation scheme. Therefore, in this application, after the second modulation scheme is determined, the relay device and the second device can determine, only by learning of one (that is, a known party) of the first quantization level and the first modulation scheme, the other of the first quantization level and the first modulation scheme based on the second modulation scheme and the known party.

To be specific, optionally, the method further includes: The relay device determines the first modulation scheme based on the second modulation scheme and the first quantization level.

Alternatively, optionally, the method further includes: The relay device determines the first quantization level based on the second modulation scheme and the first modulation scheme.

Optionally, before the relay device sends the first signal to the second device, the method further includes:

The relay device multiplies the first symbol and a first coefficient.

In an implementation, the first coefficient corresponds to the second modulation scheme.

In an implementation, the first coefficient corresponds to the first modulation scheme and the second modulation scheme.

For example, if the first modulation scheme is a QPSK scheme, the first coefficient is 1 when the second modulation scheme is QPSK modulation;

the first coefficient is $$\frac{3\sqrt{2}}{\sqrt{10}}$$

when the second modulation scheme is 16-order quadrature amplitude modulation;

the first coefficient is $$\frac{7\sqrt{2}}{\sqrt{42}}$$

when the second modulation scheme is 64-order quadrature amplitude modulation; or the first coefficient is $$\frac{15\sqrt{2}}{\sqrt{170}}$$

when the second modulation scheme is 256-order quadrature amplitude modulation.

Manner 2

To be specific, that the relay device sends a second signal to a second device includes: The relay device modulates the first information based on a third modulation scheme, to generate a second symbol. The third modulation scheme includes a quadrature phase shift keying QPSK modulation scheme, and the second signal includes the second symbol.

Optionally, before the relay device sends the second signal to the second device, the method further includes: The relay device replaces a real part of the second symbol with a first threshold when the real part of the second symbol is less than or equal to the first threshold.

Optionally, before the relay device sends the second signal to the second device, the method further includes: The relay device replaces an imaginary part of the second symbol with a second threshold when the imaginary part of the second symbol is less than or equal to the second threshold.

This can reduce a peak-to-average power ratio of the second signal (PAPR).

By way of example but not limitation, the first threshold is 10% to 20% of a value of a real part of a second symbol whose real part is largest in the plurality of second symbols.

By way of example but not limitation, the second threshold is 10% to 20% of a value of an imaginary part of a second symbol whose imaginary part is largest in the plurality of second symbols.

Optionally, before the relay device sends the second signal to the second device, the method further includes: The relay device multiplies the second symbol and a first coefficient. The first coefficient corresponds to a third modulation scheme.

The third modulation scheme corresponds to quality of a channel between the relay device and the second device.

Alternatively, the third modulation scheme may also be understood as a modulation scheme used when the relay device and the second device transmit the second bit. In other words, the third signal may be generated after the second bit is modulated based on the third modulation scheme.

In an implementation, the third modulation scheme is configured by the network device.

Optionally, before the relay device sends the first signal to the second device, the method further includes:

The relay device multiplies the first symbol and a first coefficient.

The first coefficient corresponds to the third modulation scheme.

For example, the first coefficient is 1 when the third modulation scheme is QPSK modulation.

For another example, the first coefficient is $$\frac{3\sqrt{2}}{\sqrt{10}}$$

when the third modulation scheme is 16-order quadrature amplitude modulation.

For another example, the first coefficient is $$\frac{7\sqrt{2}}{\sqrt{42}}$$

when the third modulation scheme is 64-order quadrature amplitude modulation.

For another example, the first coefficient is $$\frac{15\sqrt{2}}{\sqrt{170}}$$

when the third modulation scheme is 256-order quadrature amplitude modulation.

According to a second aspect, a wireless communication method is provided. The method includes: A second device receives a first signal sent by a first device, where the first signal carries a plurality of bits. The second device receives a second signal sent by a relay device, where the second signal carries a plurality of pieces of first information, the plurality of pieces of first information one-to-one correspond to a plurality of first bits, first information corresponding to each first bit is determined by the relay device based on a probability that the first bit is 1 and a probability that the first bit is 0, and the first bits include a part or all of the plurality of bits carried in the first signal. The second device decodes the first signal and the second signal, to obtain the bits carried in the first signal.

Optionally, the method further includes: The second device demodulates the second signal based on a first quantization level, a first modulation scheme, and a second modulation scheme, to obtain the first information. The second signal is generated after quantization based on the first quantization level, modulation based on the first modulation scheme, and constellation point mapping based on the second modulation scheme are performed on the first information; the second modulation scheme corresponds to quality of a channel between the relay device and the second device; and a first constellation diagram and a second constellation diagram include a same quantity of constellation points, the first constellation diagram is a constellation diagram corresponding to the first quantization level and the first modulation scheme, and the second constellation diagram is a constellation diagram corresponding to the second modulation scheme.

Optionally, the method further includes: The second device receives first indication information sent by a network device, where the first indication information indicates the first modulation scheme; and/or the second device receives second indication information sent by the network device, where the second indication information indicates the first quantization level.

Optionally, the method further includes: The second device determines the first modulation scheme based on the second modulation scheme and the first quantization level; or the second device determines the first quantization level based on the second modulation scheme and the first modulation scheme.

Optionally, the method further includes: The second device demodulates the second signal based on a third modulation scheme, to obtain the first information. The third modulation scheme includes a quadrature phase shift keying QPSK modulation scheme.

Optionally, the first bits include a bit that is incorrectly decoded by the relay device and that is in the plurality of bits carried in the first signal.

Optionally, the method further includes: The second device receives a third signal sent by the relay device. The third signal carries a plurality of second bits, and the second bits include a bit that is correctly decoded by the relay device and that is in the plurality of bits carried in the first signal.

Optionally, the first information and the second bits are sent in a cascading manner.

Optionally, the method further includes: The second device receives third indication information sent by the network device. The third indication information indicates a sequence of sending the first information and the second bits.

Optionally, the first information and the second bits are sent through time division multiplexing or frequency division multiplexing.

Optionally, the method further includes: The second device receives fourth indication information sent by the network device, where the fourth indication information indicates a plurality of resources, and the plurality of resources one-to-one correspond to the plurality of bits carried in the first signal. That the second device receives a second signal sent by a relay device includes: The relay device sends, to the second device on a resource corresponding to each first bit, the first information corresponding to the first bit.

According to a third aspect, a wireless communication apparatus is provided, including: a transceiver unit, configured to receive a first signal sent by a first device, where the first signal carries a plurality of bits; and a processing unit, configured to decode the first signal, to determine first information corresponding to each of a plurality of first bits, where the first information corresponding to each first bit is determined based on a probability that the first bit is 1 and a probability that the first bit is 0, and the first bits include a part or all of the plurality of bits carried in the first signal; and the transceiver unit is further configured to send a second signal to a second device, where the second signal carries the first information.

Optionally, the processing unit is specifically configured to: quantize the first information based on a first quantization level; modulate quantized first information based on a first modulation scheme, to generate a first symbol; and map the first symbol to a constellation point based on a second modulation scheme. The second signal includes the first symbol; the second modulation scheme corresponds to quality of a channel between the relay device and the second device; and a first constellation diagram and a second constellation diagram include a same quantity of constellation points, the first constellation diagram is a constellation diagram corresponding to the first quantization level and the first modulation scheme, and the second constellation diagram is a constellation diagram corresponding to the second modulation scheme.

Optionally, the transceiver unit is further configured to receive first indication information sent by a network device. The first indication information indicates the first modulation scheme.

Optionally, the transceiver unit is further configured to receive second indication information sent by the network device. The second indication information indicates the first quantization level.

Optionally, the processing unit is further configured to determine the first modulation scheme based on the second modulation scheme and the first quantization level.

Optionally, the processing unit is further configured to determine the first quantization level based on the second modulation scheme and the first modulation scheme.

Optionally, the processing unit is further configured to modulate the first information based on a third modulation scheme, to generate a second symbol. The third modulation scheme includes a quadrature phase shift keying QPSK modulation scheme, and the second signal includes the second symbol.

Optionally, the processing unit is further configured to replace, by the relay device, a real part of the second symbol with a first threshold when the real part of the second symbol is less than or equal to the first threshold.

Optionally, the processing unit is further configured to replace, by the relay device, an imaginary part of the second symbol with a second threshold when the imaginary part of the second symbol is less than or equal to the second threshold.

Optionally, the processing unit is further configured to multiply the second symbol and a first coefficient. The first coefficient corresponds to a third modulation scheme; and the third modulation scheme corresponds to quality of a channel between the relay device and the second device; or the third modulation scheme is configured by a network device.

Optionally, the first coefficient is 1 when the third modulation scheme is QPSK modulation;
the first coefficient is $$\frac{3\sqrt{2}}{\sqrt{10}}$$

when the third modulation scheme is 16-order quadrature amplitude modulation;
the first coefficient is $$\frac{7\sqrt{2}}{\sqrt{42}}$$

when the third modulation scheme is 64-order quadrature amplitude modulation; or
the first coefficient is $$\frac{15\sqrt{2}}{\sqrt{170}}$$

when the third modulation scheme is 256-order quadrature amplitude modulation.

Optionally, the first bits include an incorrectly decoded bit in the plurality of bits carried in the first signal.

Optionally, the transceiver unit is further configured to send a third signal to the second device. The third signal carries a plurality of second bits, and the second bits include a correctly decoded bit in the plurality of bits carried in the first signal.

Optionally, the first information and the second bits are sent in a cascading manner.

Optionally, the transceiver unit is further configured to receive third indication information sent by the network device. The third indication information indicates a sequence of sending the first information and the second bits.

Optionally, the first information and the second bits are sent through time division multiplexing or frequency division multiplexing.

Optionally, the transceiver unit is further configured to receive fourth indication information sent by the network device, where the fourth indication information indicates a plurality of resources, and the plurality of resources one-to-one correspond to the plurality of bits carried in the first signal; and send, to the second device on a resource corresponding to each first bit, the first information corresponding to the first bit.

According to a fourth aspect, a wireless communication apparatus is provided, including: a transceiver unit, configured to: receive a first signal sent by a first device, where the first signal carries a plurality of bits, and receive a second signal sent by a relay device, where the second signal carries a plurality of pieces of first information, the plurality of pieces of first information one-to-one correspond to a plurality of first bits, first information corresponding to each first bit is determined by the relay device based on a probability that the first bit is 1 and a probability that the first bit is 0, and the first bits include a part or all of the plurality of bits carried in the first signal; and a processing unit, configured to decode the first signal and the second signal, to obtain the bits carried in the first signal.

Optionally, the processing unit is further configured to demodulate the second signal based on a first quantization level, a first modulation scheme, and a second modulation scheme, to obtain the first information. The second signal is generated after quantization based on the first quantization level, modulation based on the first modulation scheme, and constellation point mapping based on the second modulation scheme are performed on the first information; the second modulation scheme corresponds to quality of a channel between the relay device and the second device; and a first constellation diagram and a second constellation diagram include a same quantity of constellation points, the first constellation diagram is a constellation diagram corresponding to the first quantization level and the first modulation scheme, and the second constellation diagram is a constellation diagram corresponding to the second modulation scheme.

Optionally, the transceiver unit is further configured to receive first indication information sent by a network device. The first indication information indicates the first modulation scheme.

Optionally, the transceiver unit is further configured to receive second indication information sent by the network device. The second indication information indicates the first quantization level.

Optionally, the transceiver unit is further configured to determine the first modulation scheme based on the second modulation scheme and the first quantization level.

Optionally, the transceiver unit is further configured to determine the first quantization level based on the second modulation scheme and the first modulation scheme.

Optionally, the transceiver unit is further configured to demodulate the second signal based on a third modulation scheme, to obtain the first information. The third modulation scheme includes a quadrature phase shift keying QPSK modulation scheme.

Optionally, the first bits include a bit that is incorrectly decoded by the relay device and that is in the plurality of bits carried in the first signal.

Optionally, the transceiver unit is further configured to receive a third signal sent by the relay device. The third signal carries a plurality of second bits, and the second bits include a bit that is correctly decoded by the relay device and that is in the plurality of bits carried in the first signal.

Optionally, the first information and the second bits are sent in a cascading manner.

Optionally, the transceiver unit is further configured to receive third indication information sent by the network device. The third indication information indicates a sequence of sending the first information and the second bits.

Optionally, the first information and the second bits are sent through time division multiplexing or frequency division multiplexing.

Optionally, the transceiver unit is further configured to receive fourth indication information sent by the network device, where the fourth indication information indicates a plurality of resources, and the plurality of resources one-to-one correspond to the plurality of bits carried in the first signal; and send, to the second device on a resource corresponding to each first bit, the first information corresponding to the first bit.

According to a fifth aspect, a wireless communication apparatus is provided, including the modules or units configured to perform the method in any one of the first aspect or the possible implementations of the first aspect.

According to a sixth aspect, a wireless communication apparatus is provided, including the modules or units configured to perform the method in any one of the second aspect or the possible implementations of the second aspect.

According to a seventh aspect, a wireless communication apparatus is provided, including a processor. The processor is coupled to a memory, and may be configured to perform the method in any one of the first aspect and the possible implementations of the first aspect. Optionally, the communication device further includes the memory. Optionally, the communication device further includes a communication interface, and the processor is coupled to the communication interface. Optionally, the communication device further includes a communication interface, and the processor is coupled to the communication interface.

In an implementation, the wireless communication apparatus is a relay device. When the wireless communication apparatus is a satellite, the communication interface may be a transceiver or an input/output interface.

In another implementation, the wireless communication apparatus is a chip or a chip system. When the wireless communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to an eighth aspect, a wireless communication apparatus is provided, including a processor. The processor is coupled to a memory, and may be configured to execute instructions in the memory, to perform the method according to the second aspect or the possible implementations of the second aspect, or the sixth aspect or the possible implementations of the sixth aspect. Optionally, the communication device further includes the memory. Optionally, the communication device further includes a communication interface, and the processor is coupled to the communication interface. Optionally, the transceiver may be a transceiver circuit. Optionally, the input/output interface may be an input/output circuit.

In an implementation, the wireless communication apparatus is a communication device. When the wireless communication apparatus is a communication device, the communication interface may be a transceiver or an input/output interface. Optionally, the transceiver may be a transceiver circuit. Optionally, the input/output interface may be an input/output circuit.

In another implementation, the wireless communication apparatus is a chip or a chip system. When the communication device is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a ninth aspect, a communication apparatus is provided, including an input circuit, an output circuit, and a processing circuit. The processing circuit is configured to receive a signal through the input circuit, and transmit a signal through the output circuit, to perform the method according to any one of the first aspect and the possible implementations of the first aspect, or the second aspect and the possible implementations of the second aspect.

In a specific implementation process, the communication apparatus may be a chip. The input circuit may be an input pin. The output circuit may be an output pin. The processing circuit may be a transistor, a gate circuit, a trigger, any logic circuit, or the like. An input signal received by the input circuit may be received and input by, for example, but not limited to, a receiver. A signal output by the output circuit may be output to, for example, but not limited to, a transmitter and transmitted by the transmitter. In addition, the input circuit and the output circuit may be different circuits, or may be a same circuit. In this case, the circuit is used as the input circuit and the output circuit at different moments. Specific implementations of the processor and the various circuits are not limited in embodiments of this application.

According to a tenth aspect, a processing apparatus is provided, including a processor and a memory. The processor is configured to: read instructions stored in the memory, receive a signal through a receiver, and transmit a signal through a transmitter, to perform the method in any one of the first aspect and the possible implementations of the first aspect, or the second aspect and the possible implementations of the second aspect.

Optionally, there are one or more processors, and there are one or more memories.

Optionally, the memory may be integrated with the processor, or the memory and the processor are separately disposed.

In a specific implementation process, the memory may be a non-transitory memory, such as a read-only memory (ROM). The memory and the processor may be integrated into one chip, or may be separately disposed in different chips. A type of the memory and a manner in which the memory and the processor are disposed are not limited in this embodiment of this application.

It should be understood that, a related data exchange process such as sending of indication information may be a process of outputting the indication information from the processor, and receiving of capability information may be a process of receiving the input capability information by the processor. Specifically, data output by the processor may be output to a transmitter, and input data received by the processor may be from a receiver. The transmitter and the receiver may be collectively referred to as a transceiver.

The processor in the tenth aspect may be a chip. The processor may be implemented by using hardware or software. When the processor is implemented by using hardware, the processor may be a logic circuit, an integrated circuit, or the like; or when the processor is implemented by using software, the processor may be a general-purpose processor, and is implemented by reading software code stored in the memory. The memory may be integrated into the processor, or may exist independently outside the processor.

According to an eleventh aspect, a processing apparatus is provided, including a communication interface and a processing circuit. The communication interface is configured to send first information according to the method in any one of the first aspect and the possible implementations of the first aspect, and the processing circuit is configured to generate the first information.

According to a twelfth aspect, a processing apparatus is provided, including a communication interface and a processing circuit. The communication interface is configured to obtain first information, and the processing circuit is configured to process the first information according to the method in any one of the aspect and the possible implementations of the aspect.

According to a thirteenth aspect, a computer program product is provided. The computer program product includes a computer program (which may also be referred to as code or instructions). When the computer program is run, a computer is enabled to perform the method in any one of the first aspect and the possible implementations of the first aspect, or the second aspect and the possible implementations of the second aspect.

According to a fourteenth aspect, a computer-readable medium is provided. The computer-readable medium stores a computer program (which may also be referred to as code or instructions). When the computer program is run on a computer, the computer is enabled to perform the method in any one of the first aspect and the possible implementations of the first aspect, or the second aspect and the possible implementations of the second aspect.

According to a fifteenth aspect, a communication system is provided, including the foregoing relay device and the foregoing second device.

Optionally, the communication system further includes the network device.

Optionally, the communication system further includes the first device.

DESCRIPTION OF EMBODIMENTS

The following describes technical solutions of this application with reference to accompanying drawings.

The technical solutions of embodiments of this application may be applied to various communication systems, such as a global system for mobile communications (GSM) system, a code division multiple access (CDMA) system, a wideband code division multiple access (WCDMA) system, a general packet radio service (GPRS), a long-term evolution (LTE) system, an LTE frequency division duplexing (FDD) system, an LTE time division duplexing (TDD), a universal mobile telecommunications system (UMTS), a worldwide interoperability for microwave access (WiMAX) communication system, a future 5th generation (5G) system, or a new radio (NR) system.

A terminal device in embodiments of this application may also be referred to as user equipment, an access terminal, a subscriber unit, a subscriber station, a mobile station, a mobile, a remote station, a remote terminal, a mobile device, a user terminal, a terminal, a wireless communication device, a user agent, a user apparatus, or the like. Alternatively, a terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in embodiments of this application.

A network device in embodiments of this application may be a device configured to communicate with a terminal device. The network device may be a base transceiver station (BTS) in a global system for mobile communications (GSM) system or a code division multiple access (CDMA) system, a NodeB (NB) in a wideband code division multiple access (WCDMA) system, an evolved NodeB (Evolutional NodeB, eNB or eNodeB) in an LTE system, or a radio controller in a cloud radio access network (CRAN) scenario. Alternatively, the network device may be a relay node, an access point, a vehicle-mounted device, a wearable device, a network device in a future 5G network, a network device in a future evolved PLMN network, or the like. This is not limited in embodiments of this application.

Figure 1:
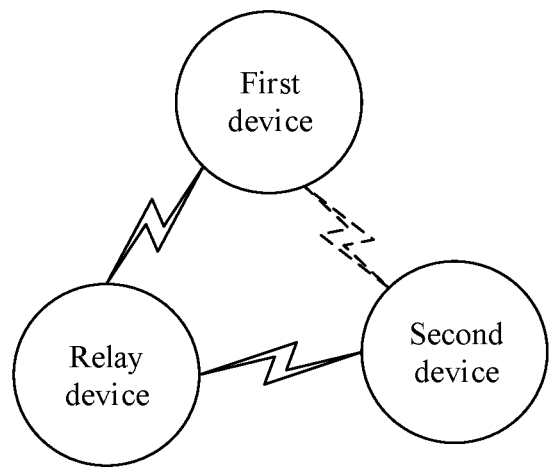
FIG. 1 is a schematic diagram of a structure of an example of a communication system applicable to this application.

FIG. 1 is a schematic diagram of an example of a communication system according to this application. As shown in FIG. 1, the communication system includes a first device, a relay device, and a second device.

The first device is communicatively connected to the relay device. In this way, the relay device can receive data sent by the first device.

In an implementation, the first device may be further communicatively connected to the second device. In this way, the second device can receive data sent by the first device.

The relay device is communicatively connected to the second device. In this way, the second device can receive data sent by the relay device.

In this application, the relay device is configured to forward the data from the first device to the second device.

By way of example but not limitation, the first device may be a source end of data.

Alternatively, the first device may be a previous-hop node of the relay device on a data relay path.

In addition, the second device may be a destination end of data.

Alternatively, the second device may be a next-hop node of the relay device on a data relay path.

In addition, the first device may be a terminal device, or may be an access network device. This is not particularly limited in this application.

Similarly, the second device may be a terminal device, or may be an access network device. This is not particularly limited in this application.

In addition, the relay device may be a terminal device, or may be an access network device. This is not particularly limited in this application.

Figure 2:
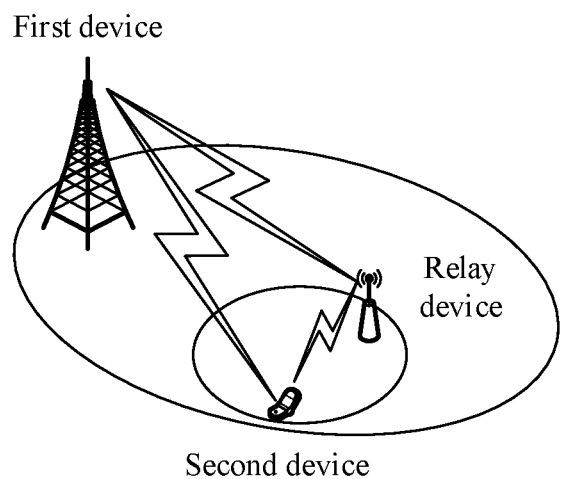
FIG. 2 is a schematic diagram of an example of a communication scenario according to this application.

For example, FIG. 2 shows an example of an application scenario of this application. In the scenario shown in FIG. 2, the second device may be a terminal device, the first device is an access network device, and the terminal device is located at an edge of coverage of the access device. Consequently, communication effect is poor. In this case, the relay device may forward, to the terminal device, data that needs to be sent by the access network device to the terminal device.

Figure 3:
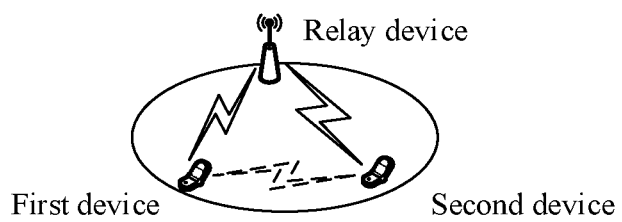
FIG. 3 is a schematic diagram of another example of a communication scenario according to this application.

For another example, FIG. 3 shows an example of an application scenario of this application. In the scenario shown in FIG. 3, the second device may be a terminal device, and the first device is a terminal device. In other words, the two terminal devices may perform inter-device communication by using the relay device.

It should be understood that the scenarios shown in FIG. 2 and FIG. 3 are merely examples for description, and this application is not limited thereto. For example, this application may also be applied to a process in which a terminal device (an example of the first device) sends uplink data to an access network device (that is, an example of the second device) via a relay device.

Figure 4:
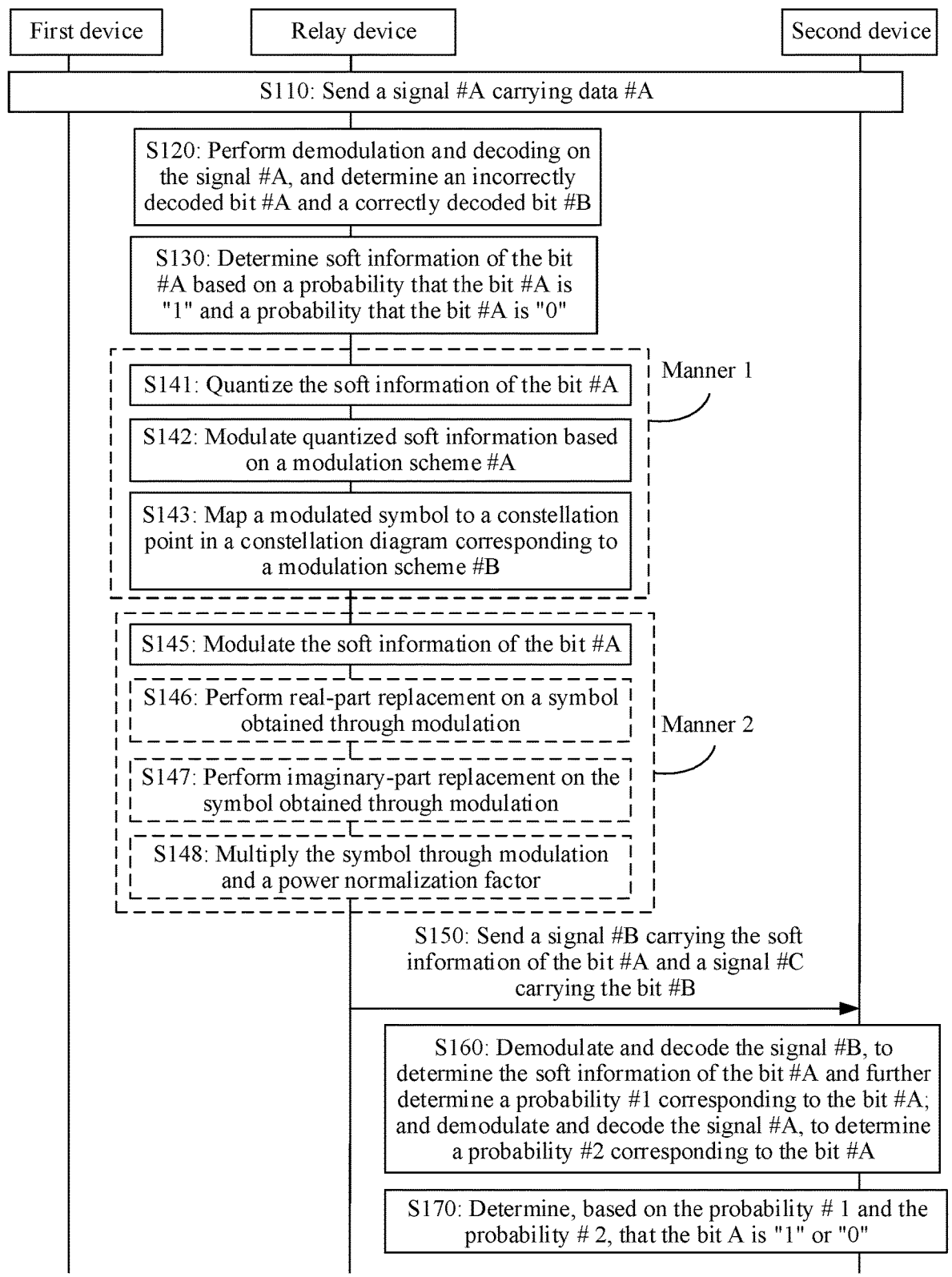
FIG. 4 is a schematic diagram of interaction in an example of a communication process according to this application.

FIG. 4 shows a process in which a device #A (that is, an example of a first device) transmits data (denoted as data #A) to a device #B (that is, an example of a second device) through forwarding of a device #B (an example of a relay device).

As shown in FIG. 4, in S110, the device #A sends a signal #A to a device #B, where the signal #A carries data #A.

The data #A includes a plurality of bits.

In an implementation, the device #A may further send the signal #A to a device #C.

In another implementation, the device #B may forward the signal #A to the device #C. For example, the device #B may amplify and send the signal #A in an analog domain in an amplify-and-forward (AF) data transmission mode.

In this way, the device #B and the device #C can receive the signal #A carrying the data #A In S120, the device #B demodulates and decodes the signal #A.

The plurality of bits included in the data #A include a plurality of bits #A (that is, first bits) that are not correctly decoded by the device #B.

By way of example but not limitation, the bits A may be all bits of the data #A, or the bit #A may be a part of bits of the data #A. This is not particularly limited in this application.

In addition, the plurality of bits included in the data #A may include a plurality of bits #B (that is, second bits) that are correctly decoded by the device #B.

In S130, the device #B determines soft information (that is, an example of first information) of each of the plurality of bits #A.

Processes of determining soft information of the bits #A are similar. For ease of understanding, a process of determining soft information (denoted as soft information #A1) of a bit #A (denoted as a bit #A1) is used as an example for description.

In this application, the soft information #A1 indicates a probability that the bit #A1 obtained by the device #B through decoding is "1"; and/or the soft information #A1 indicates a probability that the bit #A1 obtained after the device #B through decoding is "0".

By way of example but not limitation, the soft information #A1 may be determined based on a log-likelihood ratio (likelihood rate, LLR).

It is assumed that the bit #A1 is an $i^{th}$ bit in the plurality of bits included in the data #A, and is denoted as $b_i$. In this case, the log-likelihood ratio $L(b_i)$ corresponding to the soft information #A1 may be expressed as:

$$L(b_i) = \ln\frac{p(b_i = 1)}{p(b_i = 0)}$$

$p(b_i=1)$ represents a probability that $b_i$ is "1", and $p(b_i=0)$ represents a probability that $b_i$ is "0".

In addition, theoretically, a value range of soft information of a bit is between positive and negative infinity. In actual implementation, a boundary is usually limited, for example, limited to [−Lim, +Lim].

By way of example but not limitation, the soft information #A1 may be determined in the following Manner a or Manner b.

Manner a

To be specific, if Lim=1, a range of $L(b_i)$ is [−1, +1].

In addition, when $b_i$ is set to "1", $L(b_i)=-1$; or when $b_i$ is set to "0", $L(b_i)=1$. In this case, a value of the soft information #A1 is $\tilde{a}_i$, a value range of $\tilde{a}_i$ is [−1, +1], and $\tilde{a}_i$ may be expressed as:

$$\tilde{a}_i = -1 \cdot p(b_i = 1) + 1 \cdot p(b_i = 0) = -\frac{e^{L(b_i)}}{1+e^{L(b_i)}} + \frac{1}{1+e^{L(b_i)}} = -\tanh\frac{L(b_i)}{2}$$

Manner b

To be specific, when $b_i$ is set to "1", $L(b_i)=1$; or when $b_i$ is set to "0", $L(b_i)=0$. In this case, a value of the soft information #A1 is $\tilde{a}_i$, a value range of $\tilde{a}_i$ is [0, 1], and $\tilde{a}_i$ may be expressed as:

$$\tilde{a}_i = 1 \cdot p(b_i = 1) + 0 \cdot p(b_i = 0) = \frac{e^{L(b_i)}}{1+e^{L(b_i)}}$$

Then, the device #B modulates the determined soft information of each bit #A to generate a signal (denoted as signal #B) and transmits the signal.

Modulation processes of the soft information of the bits #A are similar. For ease of understanding, the following uses a modulation process of soft information #A1 of a bit #A1 as an example for description.

By way of example but not limitation, in this application, either of the following Manner 1 and Manner 2 may be listed for modulation.

For ease of understanding, a process of determining soft information in the foregoing Manner b is used as an example for description.

Manner 1

Specifically, because the soft information $\tilde{a}_i$ is any real number of [0, 1], if the soft information is directly modulated, a possible position of a generated constellation point in a constellation diagram is infinitely possible. This is unfavorable to noise reduction.

Therefore, in S141, the device #B may quantify $\tilde{a}_i$ based on a quantization level (that is, a quantity of quantization intervals, denoted as N).

The quantization may be uniform quantization, or may be non-uniform quantization. This is not particularly limited in this application.

For example, the following Table 1 shows an example of a correspondence between a quantization interval and a value that is after quantization in this application.

TABLE 1

| Value range of soft information $\tilde{i}$, that is before quantization | Value of soft information that is after quantization |
|---|---|
| $[0, C_{N-2})$ | $a_{N-1}$ |
| $[C_{N-2}, C_{N-3})$ | $a_{N-2}$ |
| ... | ... |
| $[C_1, C_0)$ | $a_1$ |
| $[C_0, 1)$ | $a_0$ |

For another example, the following Table 2 shows an example of a correspondence, corresponding to a case in which N=4, between a quantization interval and a value of quantized soft information.

TABLE 2

| Value range of soft information $\tilde{i}$, that is before quantization | Value of soft information that is after quantization |
|---|---|
| [0, 0.25) | 0 |
| [0.25, 0.5) | 0.25 |
| [0.5, 0.75) | 0.75 |
| [0.75, 1) | 1 |

In this application, the quantization level N, the quantization interval, or the table for quantization may be specified by a communication system or a communication protocol, or may be indicated by an access network device by using higher layer signaling (for example, RRC signaling). This is not particularly limited in this application.

In S142, the device #A may modulate the determined quantized soft information #A1 (denoted as soft information #A1') based on the modulation scheme #A (that is, an example of a first modulation scheme).

For ease of understanding, it is assumed that a symbol obtained by modulating quantized soft information (denoted as a(i)) of an $i^{th}$ bit in the plurality of bits included in the data #A is d (i).

By way of example but not limitation, the modulation scheme #A may include but is not limited to any one of the following modulation schemes:

1. Binary Phase Shift Keying (BPSK) Modulation $$d(i) = \frac{1}{\sqrt{2}}[(1 - 2a(i)) + j(1 - 2a(i))]$$

2. π/2-BPSK $$d(i) = \frac{e^{j\frac{\pi}{2}(i \bmod 2)}}{\sqrt{2}}[(1 - 2a(i)) + j(1 - 2a(i))]$$

3. Quadrature Phase Shift Keying (QPSK) Modulation $$d(i) = \frac{1}{\sqrt{2}}[(1 - 2a(2i)) + j(1 - 2a(2i + 1))]$$

4. 16-Order Quadrature Amplitude Modulation (16 QAM)

$$d(i) = \frac{1}{\sqrt{10}}$$

$$\{(1 - 2a(4i))[2 - (1 - 2a(4i + 2))] + j(1 - 2a(4i + 1))[2 - (1 - 2a(4i + 3))]\}$$

5. (64 QAM)

$$d(i) = \frac{1}{\sqrt{42}}\{(1 - 2a(6i))[4 - (1 - 2a(6i + 2))[2 - (1 - 2a(6i + 4))]] +$$

$$j(1 - 2a(6i + 1))[4 - (1 - 2a(6i + 3))[2 - (1 - 2a(6i + 5))]]\}$$

6. (256 QAM)

$$d(i) = \frac{1}{\sqrt{170}}\{(1 - 2a(8i))[8 - (1 - 2a(8i + 2))[4 -$$

$$(1 - 2a(8i + 4))[2 - (1 - 2a(8i + 6))]]] + j(1 - 2a(8i + 1))[8 -$$

$$(1 - 2a(8i + 3))[4 - (1 - 2a(8i + 5))[2 - (1 - 2a(8i + 7))]]]\}$$

In S143, the device #B may map the foregoing generated symbol to a constellation point, to generate a signal #B (that is, an example of a second signal).

It is assumed that a modulation scheme corresponding to a channel between the device #B and the device #C is a modulation scheme #B (that is, an example of a second modulation scheme).

The device #B and the device #C may determine the modulation scheme #B based on quality of the channel between the device #B and the device #C.

Alternatively, the network device may configure, for the device #B and the device #C, the modulation scheme #B used for communication between the device #B and the device #C.

In this application, due to impact of different modulation objects and different modulation schemes, a parameter of a constellation point (for example, a position of the constellation point or an amplitude of the constellation point) in a constellation diagram corresponding to the modulation scheme #A is different from a parameter of a constellation point in a constellation diagram corresponding to the modulation scheme #B.

In this application, there is an association relationship between a quantization level N, the modulation scheme #A, and the modulation scheme #B. In other words, it is assumed that there are X constellation points generated after quantization based on the quantization level N and modulation based on the modulation scheme #A are performed. In this case, if there are Y constellation points corresponding to the modulation scheme #B, in this application, the association relationship may be understood as X=Y.

In an implementation, different modulation schemes #B may correspond to different quantization levels N when the modulation scheme #A is determined (or fixed).

The following Table 3 shows an example of a correspondence between a modulation scheme #B and a value of a quantization level N when the modulation scheme #A is π/2-BPSK or BPSK.

TABLE 3

| Quantization level N | Modulation scheme #B |
| --- | --- |
| 4 | QPSK |
| 16 | 16 QAM |
| 64 | 64 QAM |
| 256 | 256 QAM |

In another implementation, a specific manner of the modulation scheme #A and a specific value of the quantization level N may constitute a combination. In this case, a plurality of different combinations may be included based on the modulation scheme #A and the quantization level N. Each combination may correspond to one modulation scheme #B.

The following Table 4 shows an example of a correspondence between the modulation scheme #A, the quantization level N, and the modulation scheme #B.

| Modulation scheme #A | Quantization level N | Modulation scheme #B |
| --- | --- | --- |
| QPSK | 4 | 16 QAM |
| QPSK | 8 | 64 QAM |
| QPSK | 16 | 256 QAM |
| 16 QAM | 4 | 256 QAM |

Therefore, to facilitate noise reduction at a receiving end, in this application, the device #B maps, based on a preset correspondence (denoted as a correspondence #A), a symbol (for example, a symbol #A) generated after the foregoing soft information is modulated in the modulation scheme #A to a constellation point in a constellation diagram corresponding to the modulation scheme #B.

In other words, the device #B maps, based on the correspondence #A, a constellation point in a constellation diagram corresponding to the modulation scheme #A to the constellation point in the constellation diagram corresponding to the modulation scheme #B.

For ease of understanding, use case 1 and use case 2 are used as examples in the following to describe a mapping process of the constellation point.

Use Case 1

Figure 5:
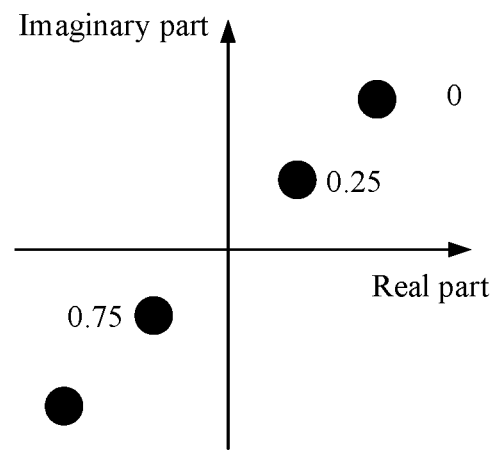
FIG. 5 is a schematic diagram of an example of a constellation diagram formed after soft information is modulated according to this application.

FIG. 5 shows constellation points corresponding to symbols generated when the modulation scheme #A is π/2-BPSK or BPSK. In other words, FIG. 5 shows a constellation diagram corresponding to the modulation scheme #A when the modulation scheme #A is π/2-BPSK or BPSK. As shown in FIG. 5, the constellation points in the constellation diagram corresponding to the modulation scheme #A are arranged in one dimension.

Figure 6:
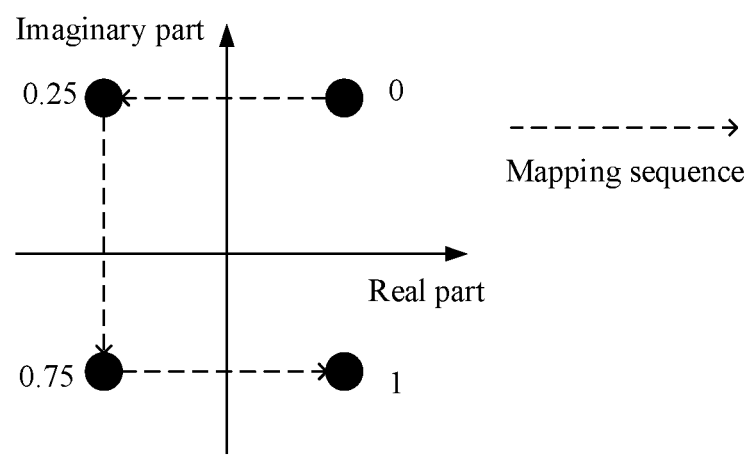
FIG. 6 is a schematic diagram of an example of a constellation diagram of a signal carrying soft information according to this application.

FIG. 6 shows a constellation diagram corresponding to the modulation scheme #B when the modulation scheme #B is QPSK. As shown in FIG. 6, constellation points in the constellation diagram corresponding to the modulation scheme #B are arranged in two dimensions.

For example, when the quantization level N=4, a value of the soft information is one of 0, 0.25, 0.75, or 1. FIG. 5 shows constellation points corresponding to the foregoing value 4.

In this case, in a mapping mode shown in FIG. 6, the constellation points in FIG. 5 may be mapped to constellation points in FIG. 6; or for a symbol (for example, the symbol #A) generated after modulation based on the modulation scheme #A is performed, the symbol #A may be mapped to one of the four constellation points shown in FIG. 6 based on a value (specifically, a value obtained after quantization) of soft information that is before modulation and that corresponds to the symbol #A.

Figure 7:
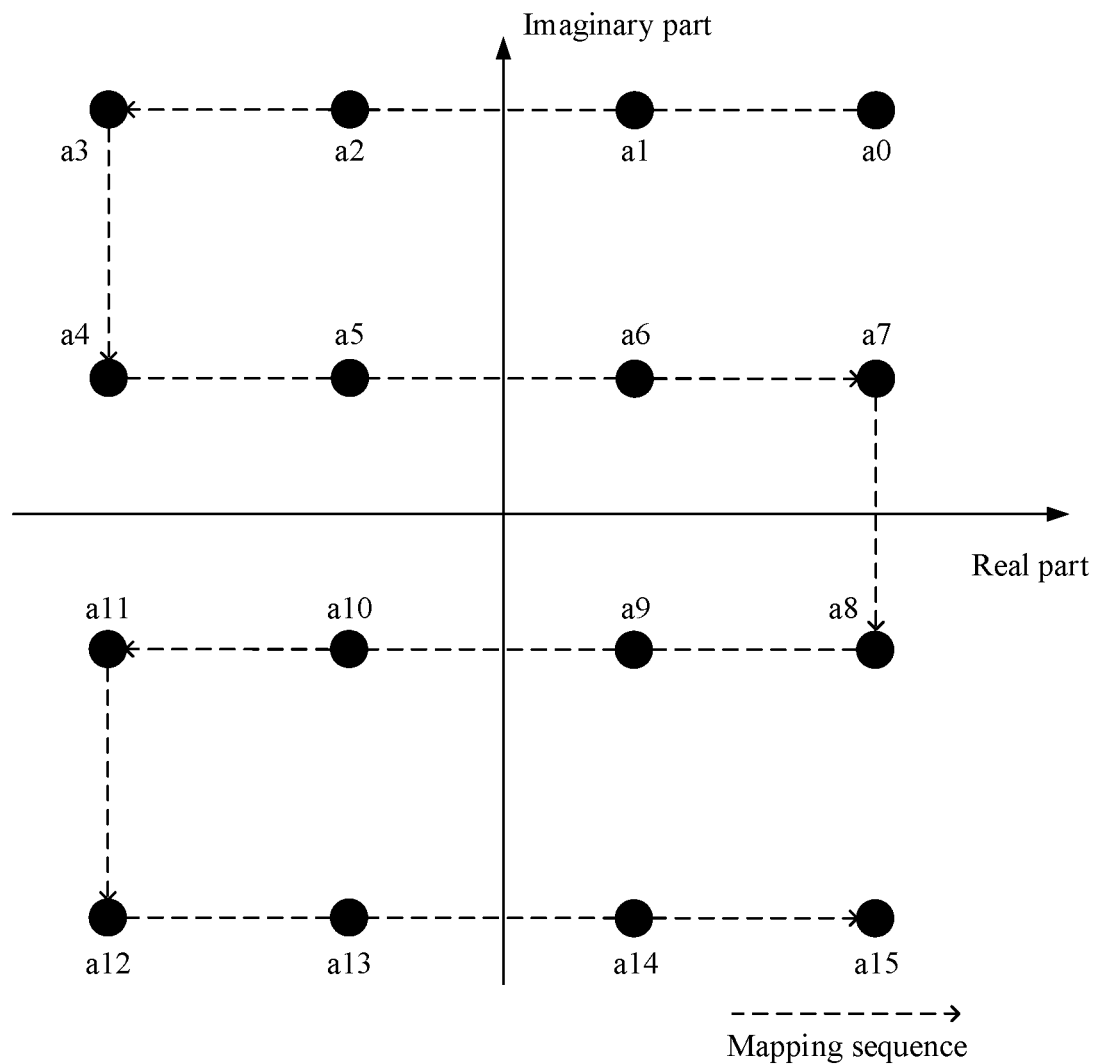
FIG. 7 is a schematic diagram of another example of a constellation diagram of a signal carrying soft information according to this application.

FIG. 7 shows an example of a mapping relationship between constellation points that are when the quantization level is 16, the modulation scheme #A is BPSK, and a second modulation scheme is 16 QAM. That is, when the quantization level is 16, soft information includes 16 values denoted as a0, a1, a2, . . . a14, a15. In this case, various values of the foregoing soft information may be sequentially mapped to the 16 constellation points corresponding to 16 QAM according to a sequence of directions of dashed-line arrows shown in FIG. 7.

Use Case 2

Figure 8:
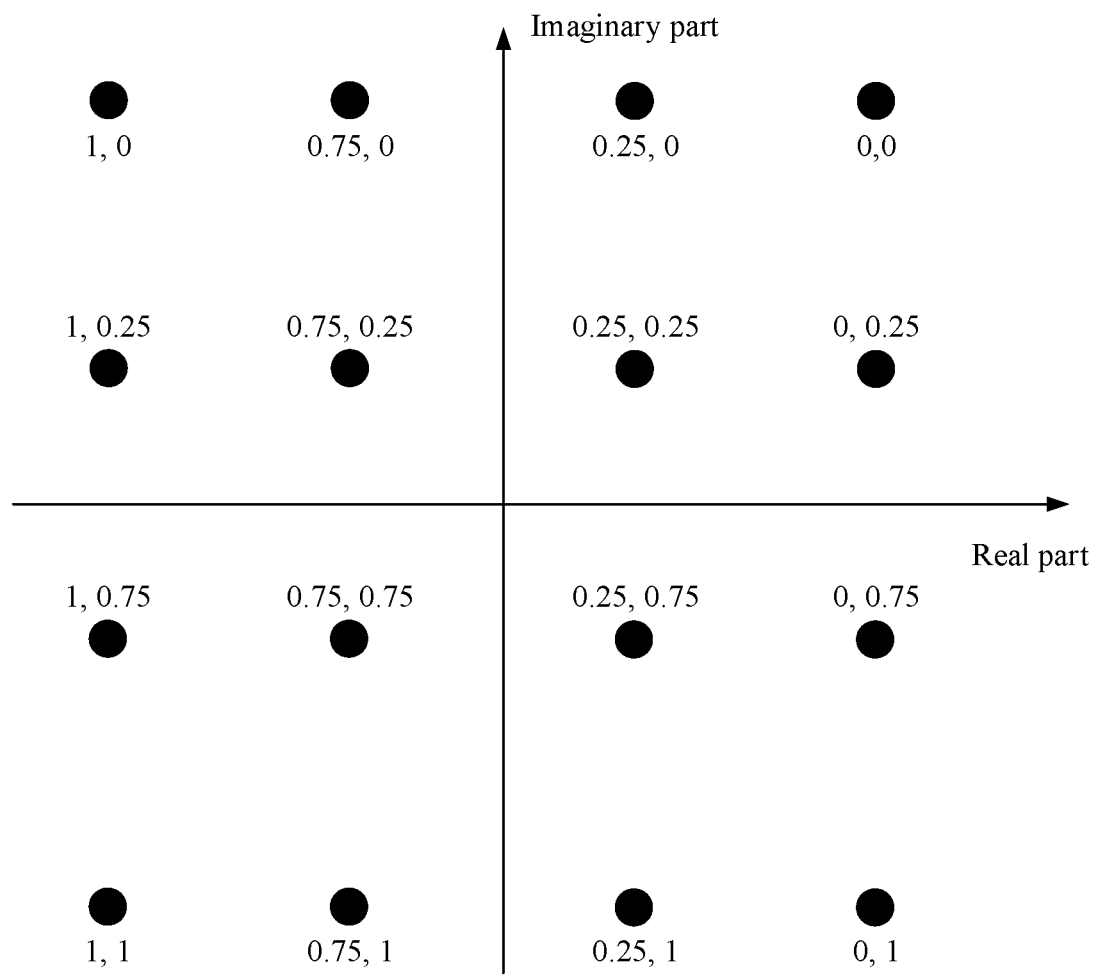
FIG. 8 is a schematic diagram of still another example of a constellation diagram of a signal carrying soft information according to this application.

FIG. 8 shows constellation points that are obtained after soft information is modulated and that are when the modulation scheme #A is QPSK and the quantization level is 4. As shown in FIG. 8, when the quantization level is 4, the soft information includes four values, and a constellation diagram obtained after modulation is performed (denoted as a constellation diagram #A) includes 16 constellation points, and a constellation diagram corresponding to 16 QAM modulation (denoted as a constellation diagram #B) also includes 16 constellation points. However, amplitudes and/or phases of constellation points in the two constellation diagrams may be different. In this case, by way of an example but not a limitation, the following correspondence may be enumerated. There are four values for projections of a constellation point in the constellation diagram #A on the x-axis (real number field), and there are also four values for projections of a constellation point in the constellation diagram #B on the x-axis. In this case, the projections of the two constellation diagrams on the x-axis may one-to-one correspond to each other based on the values for the projections. For example, a constellation point with a largest projection in the constellation diagram #A on the x-axis is mapped to a constellation point with a largest projection in the constellation diagram #B on the x-axis, a constellation point with a second largest projection in the constellation diagram #A on the x-axis is mapped to a constellation point with a second largest projection in the constellation diagram #B on the x-axis, a constellation point with a third largest projection in the constellation diagram #A on the x-axis is mapped to a constellation point with a third largest projection in the constellation diagram #B on the x-axis, and a constellation point with a smallest projection in the constellation diagram #A on the x-axis is mapped to a constellation point with a smallest projection in the constellation diagram #B on the x-axis. It should be understood that the foregoing enumerated mapping relationship determined based on the values of the projections is merely an example for description, and is not limited in this application, provided that it is ensured that the device #B and the device #C have a consistent understanding and understanding for the mapping relationship. Similarly, this one-to-one correspondence can also be applied to the y axis based on the values.

It should be noted that if there are overlapping constellation points in the constellation diagram #A, or complex values obtained through calculation based on different soft information are the same, a sequence of mapping the constellation points with the same complex values in the constellation diagram #A to the constellation diagram #B needs to be specified, to map the overlapping constellation points in the constellation diagram #A to different constellation points in the constellation diagram #B.

For example, when the modulation scheme #A is 16 QAM and the modulation scheme #B is 256 QAM, four value ranges of the soft information all are (0, 0.25, 0.75, 1). According to a 16 QAM calculation formula, a real-part value obtained based on a combination corresponding to d2=0.25 and d0=0 (denoted as a combination #1) is the same as that obtained based on a combination corresponding to d0=0.25 and d2=1 (denoted as a combination #2). In this case, constellation points corresponding to combinations with the same real-part value may be mapped to constellation points in the constellation diagram #B according to a specified sequence.

It should be understood that the foregoing enumerated quantization manners are merely examples for description, and this application is not limited thereto. For example, different soft information may also be counted by using different quantization methods. For example, when the modulation scheme #A is 16 QAM, if quantization levels of soft information corresponding to the $1^{st}$ bit and the $2^{nd}$ bit are 4, and quantization levels of the $2^{nd}$ bit and the $4^{th}$ bit are 2, a constellation diagram obtained after the soft information is modulated includes 64 constellation points. In this case, the 64 constellation points may be mapped to constellation points corresponding to 64 QAM (that is, an example of the modulation scheme #B).

Manner 2

In S145, the device #B modulates each piece of soft information determined as described above based on a QPSK scheme, to generate a plurality of symbols in a complex number field.

In an implementation, in S146, the device #B may determine whether a real-part value (for example, an absolute value) of each symbol is less than or equal to a threshold #A; and if determining that the real-part value of each symbol is less than or equal to the threshold #A, the device #B replaces the real-part value (for example, excluding a plus or minus sign) of the symbol with the threshold #A.

By way of example but not limitation, the threshold #A may be 10% to 20% of a real-part value (for example, an absolute value) of a symbol with a largest real-part value (for example, an absolute value) in the plurality of symbols.

In another implementation, in S147, the device #B may determine whether an imaginary-part value (for example, an absolute value) of each symbol is less than or equal to a threshold #B; and if the imaginary-part value of each symbol is less than or equal to the threshold #B, the device #B replaces the real- and imaginary-part value of the symbol (that is, excluding a plus or minus sign) with the threshold #B.

By way of example but not limitation, the threshold #B may be 10% to 20% of an imaginary-part value (for example, an absolute value) of a symbol with a largest imaginary-part value in the plurality of symbols.

Figure 9:
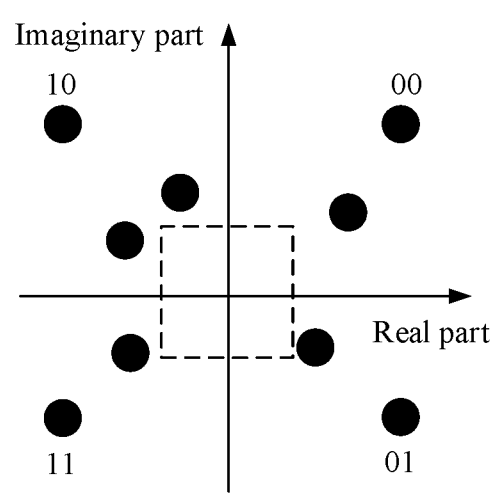
FIG. 9 is a schematic diagram of still another example of a constellation diagram of a signal carrying soft information according to this application.

A dashed-line box in FIG. 9 shows a range corresponding to the threshold #A, that is, after being processed based on the foregoing S146 and S147, constellation points are located on or outside the dashed-line box.

Optionally, in S148, the device #B may further determine a coefficient #A based on the modulation scheme #B, and multiply the obtained symbol of the soft information and the coefficient #A. The coefficient #A may also be referred to as a power normalization factor.

By way of example but not limitation, the following Table 5 shows specific values of coefficients corresponding to different modulation schemes #B.

TABLE 5

| Modulation scheme #B | Coefficient #A |
|---|---|
| QPSK | 1 |
| 16 QAM | $\frac{3\sqrt{2}}{\sqrt{10}}$ |
| 64 QAM | $\frac{7\sqrt{2}}{\sqrt{42}}$ |
| 256 QAM | $\frac{15\sqrt{2}}{\sqrt{170}}$ |

Through the foregoing processing in S146 to S148, a PAPR of a signal carrying soft information can be effectively reduced.

Through the foregoing process, the signal (that is, the signal #B) carrying the soft information can be obtained.

In S150, the device #B maps the signal #B to a resource #B, and sends the signal #B to a device #C.

In addition, the device #B may further perform processing such as encoding and modulation on a bit #B to generate a signal #C, map the signal #C to a resource #C, and send the signal #C to the device #C.

In this application, the signal #B and the signal #C may be sent in a cascading manner.

Alternatively, soft information corresponding to the bit #A and the bit #B may be sent in a cascading manner.

In this case, the device #B may send the signal #C and the signal #B based on a fixed sequence (denoted as a sequence #A), that is, the sequence #A is a sending sequence of the signal #B and the signal #C.

In an implementation, the sequence #A may be specified by a communication system or a communication protocol, the sequence #A may be configured by the network device by using higher layer signaling, for example, RRC signaling, or the sequence #A may be determined by the device #B and the device #C through negotiation. This is not particularly limited in this application, provided that it is ensured that the device #B and the device #C have a consistent understanding and understanding for the sending sequence of the signal #B and the signal #C.

Optionally, it is assumed that the device #B needs to send soft information of k1 incorrectly decoded bits (in other words, k1 pieces of soft information), and needs to send k2 correctly decoded bits. In addition, it is assumed that a symbol in a complex number field can carry M pieces of soft information. In this case, k3=k1 mod M (that is, k1 modulo M, or a remainder is taken).

In addition, if k3 is not equal to 0, 0s need to be added to the soft information, and a quantity of 0s to be added is M−k3. Then, the k1 pieces of soft information, the M−k3 to-be-added 0s, and k2 hard bits are sent in a cascading manner.

In an implementation, each bit in the data #A corresponds to one resource #1 and one resource #2.

A bit #1 is used as an example. A resource #1 of the bit #1 is used to: when the device #B correctly decodes the bit #1, carry a signal generated after the device #B performs encoding and modulation on the bit #1. A resource #2 of the bit #1 is used to: when the device #B fails to correctly decode the bit #1, carry a signal generated after the device #B modulates soft information of the bit #1.

By way of example but not limitation, the network device may allocate, by using higher layer signaling or control information, the resource #1 and the resource #2 that correspond to each bit in the data #A.

In S160, the device #C demodulates the signal #B, to obtain the soft information of the bit #A.

For example, the device #C may first determine each constellation point in the signal #B, that is, each constellation point in the constellation diagram #B corresponding to the modulation scheme #B, and map (or de-map) the constellation point to a constellation point in the constellation diagram #A corresponding to the modulation scheme #A, so as to determine a symbol corresponding to the constellation point; and then, may demodulate the symbol based on the modulation scheme #A, so as to determine the soft information.

The foregoing demodulation process may be considered as an inverse process of a process of modulating the soft information by the device #B. To avoid repetition, detailed description thereof is omitted herein.

In addition, the device #C may further demodulate and decode the signal #C, to determine the bit #B.

For ease of understanding and description, the foregoing decoding process of the bit #A1 is used as an example for description.

That is, the device #C may determine, based on the soft information of the bit #A1, a probability that the bit #A1 determined by the device #B is "1" and/or a probability that the bit #A1 is "0", where the probability is denoted as a probability #A.

In addition, the device #C may further decode the bit #A1 (that is, a bit corresponding to the soft information #A1 carried in the signal #B) in the signal #A (or the data #A carried in the signal #A), to determine that a probability that the bit #A1 is "1" and/or a probability that the bit #A1 is "0", where the probability is denoted as a probability #B.

In S170, the device #C may decode the bit #A1 based on the probability #A and the probability #B, that is, determine the bit #A1 as "1" or "0".

For example, the device #C may determine weights of the probability #A and the probability #B, and determine the bit #A1 as "1" or "0" based on a maximum probability obtained through weighted averaging.

Figure 10:
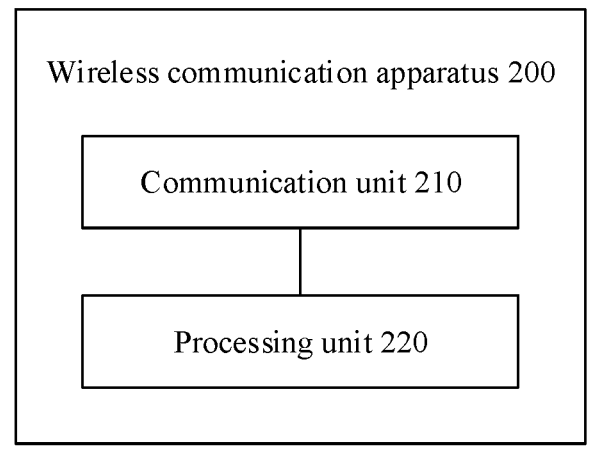
FIG. 10 is a schematic diagram of an example of a communication apparatus according to this application.

FIG. 10 is a schematic block diagram of a wireless communication apparatus according to an embodiment of this application. As shown in FIG. 10, the apparatus 200 may include a communication unit 210 and a processing unit 220. The communication unit 210 may communicate with an external device, and the processing unit 220 is configured to process data. The communication unit 210 may also be referred to as a communication interface or a transceiver unit.

In a possible design, the apparatus 200 may implement the steps or procedures performed the relay device (for example, the device #B) in the foregoing method embodiments correspondingly. The processing unit 220 is configured to perform processing-related operations of the relay device in the foregoing method embodiments, and the communication unit 210 is configured to perform sending/receiving-related operations of the relay device in the foregoing method embodiments.

In another possible design, the apparatus 200 may implement the steps or procedures performed by the second device (for example, the device #C) in the foregoing method embodiments correspondingly. The communication unit 210 is configured to perform sending/receiving-related operations of the second device in the foregoing method embodiments. The processing unit 220 is configured to perform a processing-related operation of the second device in the foregoing method embodiments.

It should be understood that the apparatus 200 herein is embodied in a form of functional units. The term "unit" herein may refer to an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described function. In an optional example, a person skilled in the art may understand that the apparatus 200 may be specifically the relay device in the foregoing embodiments, and may be configured to perform the procedures and/or the steps in the foregoing method embodiments. Alternatively, the apparatus 200 may be specifically the second device in the foregoing embodiments, and may be configured to perform the procedures and/or the steps corresponding to the second device in the foregoing method embodiments. To avoid repetition, details are not described herein again.

The apparatus 200 in the foregoing solutions has a function of implementing the corresponding steps performed by the relay device or the second device in the foregoing methods. The function may be implemented by hardware, or may be implemented by hardware executing corresponding software. The hardware or software includes one or more modules corresponding to the foregoing function. For example, the communication unit may be replaced with a transceiver (for example, a sending unit of the communication unit may be replaced with a transmitter, and a receiving unit of the communication unit may be replaced with a receiver), and another unit such as the processing unit may be replaced with a processor, to separately perform sending/receiving operations and processing-related operations in the method embodiments.

In addition, the communication unit may alternatively be a transceiver circuit (which may include, for example, a receiving circuit and a transmitter circuit), and the processing unit may be a processing circuit. In this embodiment of this application, the apparatus in FIG. 10 may be a device (for example, the relay device or the second device) in the foregoing embodiments, or may be a chip or a chip system configured in a device, for example, a system on chip (SoC). The communication unit may be an input/output circuit or a communication interface. The processing unit is a processor, a microprocessor, or an integrated circuit integrated on the chip. This is not limited herein.

Figure 11:
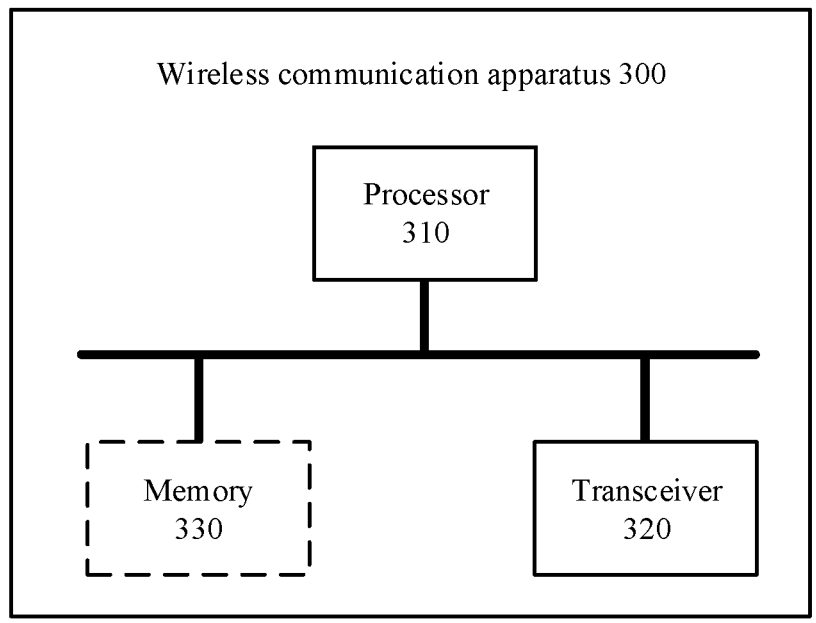
FIG. 11 is a schematic diagram of another example of a communication apparatus according to this application.

FIG. 11 shows a wireless communication apparatus 300 according to an embodiment of this application. The apparatus 300 includes a processor 310 and a transceiver 320. The processor 310 and the transceiver 320 communicate with each other through an internal connection path, and the processor 310 is configured to execute instructions, to control the transceiver 320 to send a signal and/or receive a signal.

Optionally, the apparatus 300 may further include a memory 330. The memory 330 communicates with the processor 310 and the transceiver 320 through internal connection paths. The memory 330 is configured to store instructions, and the processor 310 may execute the instructions stored in the memory 330. In a possible implementation, the apparatus 300 is configured to implement the procedures and steps corresponding to the relay device (for example, the device #B) in the foregoing method embodiments. In another possible implementation, the apparatus 300 is configured to implement the procedures and steps corresponding to the second device (for example, the device #C) in the foregoing method embodiments.

It should be understood that the apparatus 300 may be specifically the device (for example, the device #B or the device #C) in the foregoing embodiments, or may be a chip or a chip system in a network element. Correspondingly, the transceiver 320 may be a transceiver circuit of the chip. This is not limited herein. Specifically, the apparatus 300 may be configured to perform the steps and/or procedures corresponding to the device #B or the device #C in the foregoing method embodiments. Optionally, the memory 330 may include a read-only memory and a random access memory, and provide instructions and data for the processor. A part of the memory may further include a non-volatile random access memory. For example, the memory may further store information of a device type. The processor 310 may be configured to execute the instructions stored in the memory; and when executing the instructions stored in the memory, the processor 310 is configured to perform the steps and/or procedures in the foregoing method embodiments corresponding to the device #B or the device #C.

In an implementation process, the steps in the foregoing methods can be performed by using a hardware integrated logical circuit of the processor, or by using instructions in a form of software. The steps in the methods disclosed with reference to embodiments of this application may be directly executed and accomplished by using a hardware processor, or may be executed and accomplished by using a combination of hardware of the processor and a software module. A software module may be located in a storage medium mature in the art, such as a random access memory, a flash memory, a read-only memory, a programmable read-only memory, an electrically erasable programmable memory, or a register. The storage medium is located in the memory, and a processor reads information in the memory and performs the steps in the foregoing methods in combination with hardware of the processor. To avoid repetition, details are not described herein again.

It should be noted that, the processor in this embodiment of this application may be an integrated circuit chip, and has a signal processing capability. In an implementation process, the steps in the foregoing method embodiments can be performed by using a hardware integrated logical circuit of the processor, or by using instructions in a form of software. The processor may be a general purpose processor, a digital signal processor (DSP), an application-specific integrated circuit (ASIC), a field programmable gate array (FPGA) or another programmable logic device, a discrete gate or a transistor logic device, or a discrete hardware component. The processor in this embodiment of this application may implement or perform the methods, the steps, and the logical block diagrams that are disclosed in embodiments of this application. The general-purpose processor may be a microprocessor, or the processor may be any conventional processor or the like. The steps in the methods disclosed with reference to embodiments of this application may be directly executed and accomplished by using a hardware decoding processor, or may be executed and accomplished by using a combination of hardware in a decoding processor and a software module. The software module may be located in a storage medium mature in the art, such as a random access memory, a flash memory, a read-only memory, a programmable read-only memory, an electrically erasable programmable memory, or a register. The storage medium is located in the memory, and a processor reads information in the memory and performs the steps in the foregoing methods in combination with hardware of the processor.

It may be understood that the memory in this embodiment of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) used as an external cache. Through example but not limitative description, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM). It should be noted that the memory of the systems and methods described in this specification includes but is not limited to these and any memory of another proper type.

Figure 12:
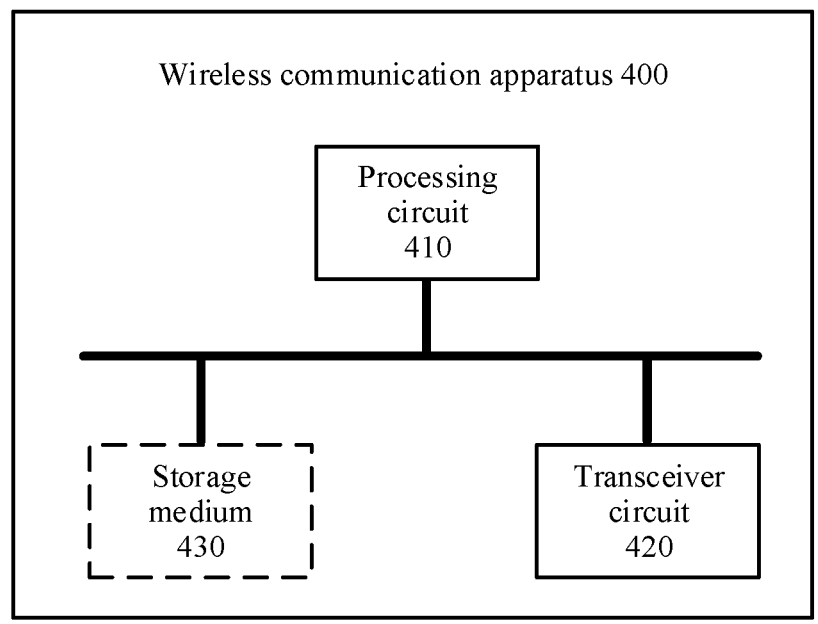
FIG. 12 is a schematic diagram of still another example of a communication apparatus according to this application.

FIG. 12 shows a wireless communication apparatus 400 according to an embodiment of this application. The apparatus 400 includes a processing circuit 410 and a transceiver circuit 420. The processing circuit 410 and the transceiver circuit 420 communicate with each other through an internal connection path, and the processing circuit 410 is configured to execute instructions, to control the transceiver circuit 420 to send a signal and/or receive a signal.

Optionally, the apparatus 400 may further include a storage medium 430. The storage medium 430 communicates with the processing circuit 410 and the transceiver circuit 420 through internal connection paths. The storage medium 430 is configured to store instructions, and the processing circuit 410 may execute the instructions stored in the storage medium 430. In a possible implementation, the apparatus 400 is configured to implement the procedures and steps corresponding to the relay device (for example, the device #B) in the foregoing method embodiments. In another possible implementation, the apparatus 400 is configured to implement the procedures and steps corresponding to the second device (for example, the device #C) in the foregoing method embodiments.

Figure 13:
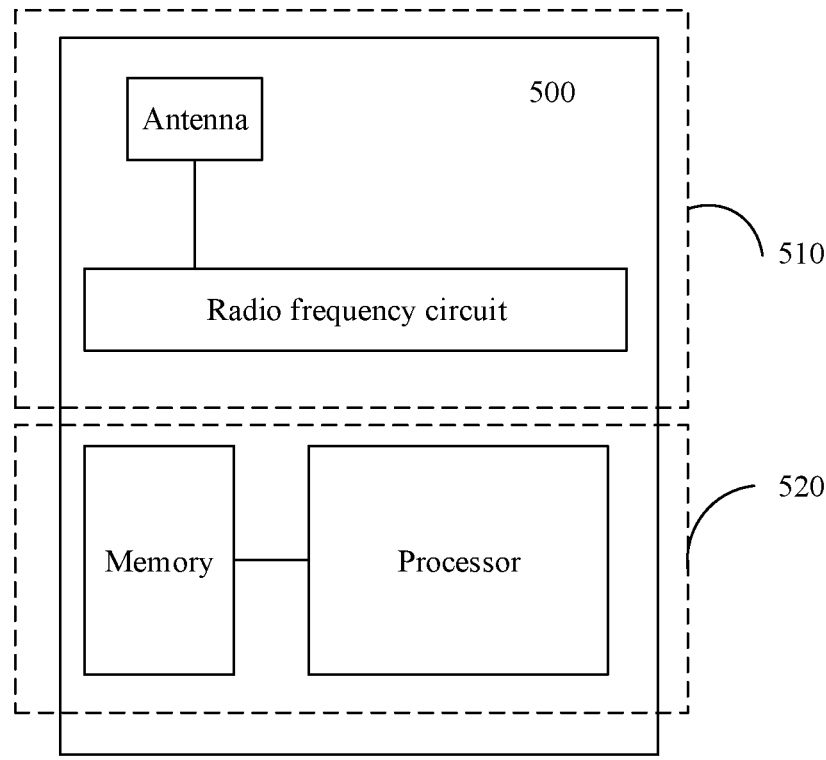
FIG. 13 is a schematic diagram of an example of a terminal device according to this application.

FIG. 13 is a schematic diagram of an example of an access network device 500 according to this application. The apparatuses shown in FIG. 10 to FIG. 12 may be configured to be in or are the access network device shown in FIG. 13. As shown in FIG. 10, the access network device 500 includes a part 510 and a part 520. The part 510 is mainly configured to send and receive a radio frequency signal and convert the radio frequency signal and a baseband signal. The part 520 is mainly configured to: perform baseband processing, control the access network device, and the like. The part 510 may be usually referred to as a transceiver unit, a transceiver machine, a transceiver circuit, a transceiver, or the like. The part 520 is usually a control center of the access network device, may be usually referred to as a processing unit, and is configured to control the access network device to perform a processing operation of the relay device or the second device in the foregoing method embodiments.

The transceiver unit in the part 510 may also be referred to as a transceiver machine, a transceiver, or the like. The transceiver unit includes an antenna and a radio frequency circuit, where the radio frequency circuit is mainly configured to perform radio frequency processing. Optionally, a component that is in the part 510 and that is configured to implement a receiving function may be considered as a receiving unit, and a component configured to implement a sending function may be considered as a sending unit. In other words, the part 510 includes the receiving unit and the sending unit. The receiving unit may also be referred to as a receiving machine, a receiver, a receiving circuit, or the like. The sending unit may be referred to as a transmitter machine, a transmitter, a transmitter circuit, or the like.

The part 520 may include one or more boards, and each board may include one or more processors and one or more memories. The processor is configured to read and execute a program in the memory, to implement a baseband processing function and control a base station. If there are a plurality of boards, the boards may be interconnected with each other to enhance a processing capability. In an optional implementation, a plurality of boards may share one or more processors, a plurality of boards may share one or more memories, or a plurality of boards may simultaneously share one or more processors.

For example, in an implementation, the transceiver unit in the part 510 is configured to perform a sending/receiving-related step that is performed by the relay device or the second device in embodiments. The part 520 is configured to perform a processing-related step performed by the relay device or the second device.

It should be understood that FIG. 13 is merely an example instead of a limitation. The network device including the transceiver unit and the processing unit may not rely on the structure shown in FIG. 13.

Figure 14:
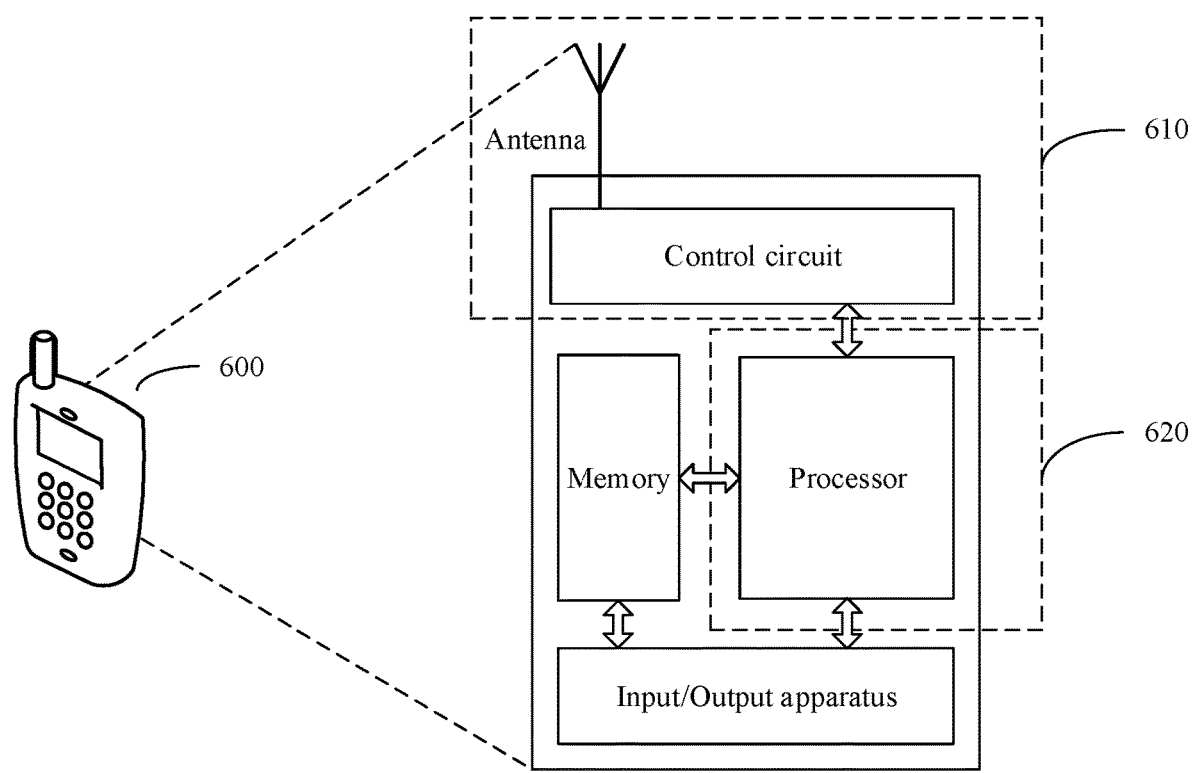
FIG. 14 is a schematic diagram of an example of an access network device according to this application.

FIG. 14 is a schematic diagram of a structure of a terminal device 600 according to this application. The communication apparatuses shown in FIG. 10 to FIG. 12 may be configured to be or may be in the terminal device 600. In other words, the terminal device 600 may perform an action performed by the relay device or the second device in the foregoing methods.

For ease of description, FIG. 14 shows only main components of the terminal device. As shown in FIG. 14, the terminal device 600 includes a processor, a memory, a control circuit, an antenna, and an input/output apparatus.

The processor is mainly configured to process a communication protocol and communication data, control the entire terminal device, execute a software program, and process data of the software program, for example, is configured to support the terminal device to perform the actions described in the foregoing embodiments of the indication method for transmitting a precoding matrix. The memory is mainly configured to store the software program and the data, for example, store a codebook described in the foregoing embodiments. The control circuit is mainly configured to convert a baseband signal and a radio frequency signal and process the radio frequency signal. The control circuit and the antenna together may also be referred to as a transceiver, and are mainly configured to send and receive a radio frequency signal in a form of an electromagnetic wave. The input/output apparatus, such as a touchscreen, a display, or a keyboard, is mainly configured to receive data input by a user and output data to the user.

After the terminal device is powered on, the processor may read the software program in the storage unit, interpret and execute instructions of the software program, and process data of the software program. When data needs to be sent wirelessly, the processor performs baseband processing on the to-be-sent data, and then outputs a baseband signal to a radio frequency circuit. The radio frequency circuit performs radio frequency processing on the baseband signal, and then sends, by using an antenna, a radio frequency signal in an electromagnetic wave form. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 14 shows only one memory and only one processor. In an actual terminal device, there may be a plurality of processors and memories. The memory may also be referred to as a storage medium, a storage device, or the like. This is not limited in embodiments of this application.

For example, the processor may include a baseband processor and a central processing unit. The baseband processor is mainly configured to process a communication protocol and communication data. The central processing unit is mainly configured to control the entire terminal device, execute a software program, and process data of the software program. The processor in FIG. 14 integrates functions of the baseband processor and the central processing unit. A person skilled in the art may understand that the baseband processor and the central processing unit may alternatively be separate processors, and are interconnected by using a technology such as a bus. A person skilled in the art may understand that the terminal device may include a plurality of baseband processors to adapt to different network standards, and the terminal device may include a plurality of central processing units to enhance a processing capability of the terminal device, and components of the terminal device may be connected by using various buses. The baseband processor may also be expressed as a baseband processing circuit or a baseband processing chip. The central processing unit may also be expressed as a central processing circuit or a central processing chip. A function of processing the communication protocol and the communication data may be built in the processor, or may be stored in the storage unit in a form of a software program, and the processor executes the software program to implement a baseband processing function.

For example, in this embodiment of this application, the antenna that has sending and receiving functions and the control circuit may be considered as a transceiver unit 610 of the terminal device 600, and the processor that has a processing function may be considered as a processing unit 620 of the terminal device 600. As shown in FIG. 11, the terminal device 600 includes the transceiver unit 610 and the processing unit 620. The transceiver unit may also be referred to as a transceiver, a transceiver machine, a transceiver apparatus, or the like. Optionally, a component that is in the transceiver unit 610 and that is configured to implement a receiving function may be considered as a receiving unit, and a component that is in the transceiver unit 610 and that is configured to implement a sending function may be considered as a sending unit. In other words, the transceiver unit includes the receiving unit and the sending unit. For example, the receiving unit may also be referred to as a receiving machine, a receiver, or a receiving circuit, and the sending unit may also be referred to as a transmitter machine, a transmitter, or a transmitter circuit.

According to the methods provided in embodiments of this application, this application further provides a computer program product. The computer program product includes computer program code. When the computer program code is run on a computer, the computer is enabled to perform the method in the embodiment shown in FIG. 4.

According to the method provided in embodiments of this application, this application further provides a computer-readable medium. The computer-readable medium stores program code. When the program code is run on a computer, the computer is enabled to perform the method in the embodiment shown in FIG. 4.

It should be understood that the processor in embodiments of this application may be a central processing unit (CPU); or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) used as an external cache. By way of example but not limitation, random access memories (RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or a part of the foregoing embodiments may be implemented using software, hardware, firmware, or any combination thereof. When software is used to implement embodiments, all or a part of the foregoing embodiments may be implemented in a form of a computer program product. The computer program product includes one or more computer instructions or computer programs. When the computer instructions or computer programs are loaded and executed on a computer, all or a part of the procedures or functions according to embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another web site, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application. It may be clearly understood by a person skilled in the art that, for the purpose of convenient and brief description, for a detailed working process of the foregoing system, apparatus, and unit, refer to a corresponding process in the foregoing method embodiments. Details are not described herein again. In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, in other words, may be located in one position, or may be distributed on a plurality of network units. A part or all of the units may be selected based on actual requirements to achieve the objectives of the solutions of embodiments. In addition, the functional units in embodiments of this application may be integrated into one processing unit, or each of the units may exist alone physically, or two or more units may be integrated into one unit. When the functions are implemented in a form of a software functional unit and sold or used as an independent product, the functions may be stored in a computer-readable storage medium. Based on such an understanding, the technical solutions of this application essentially, or the part contributing to the prior art, or a part of the technical solutions may be implemented in a form of a software product. The computer software product is stored in a storage medium, and includes several instructions for instructing a computer device (which may be a personal computer, a server, a network device, or the like) to perform all or a part of the steps in the methods described in embodiments of this application. The foregoing storage medium includes any medium that can store program code, such as a USB flash drive, a removable hard disk, a read-only memory, a random access memory, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A wireless communication method, comprising:
   receiving, by a relay device, a first signal sent by a first device, wherein the first signal carries a plurality of bits;
   decoding, by the relay device, the first signal to determine first information corresponding to each of a plurality of first bits, wherein the first information corresponding to a first bit of the plurality of first bits is determined based on a probability that the first bit is 1 and a probability that the first bit is 0, and the plurality of first bits comprise a part or all of the plurality of bits carried in the first signal; and
   sending, by the relay device, a second signal to a second device, wherein the second signal carries the first information, wherein the sending, by the relay device, a second signal to a second device comprises:
   modulating, by the relay device, the first information based on a third modulation scheme to generate a second symbol, wherein the third modulation scheme comprises a quadrature phase shift keying (QPSK) modulation scheme, and the second signal comprises the second symbol..

2. The wireless communication method according to claim 1, wherein the sending, by the relay device, a second signal to a second device comprises:
   quantizing, by the relay device, the first information based on a first quantization level;
   modulating, by the relay device, quantized first information based on a first modulation scheme to generate a first symbol;
   mapping, by the relay device, the first symbol to a constellation point based on a second modulation scheme; and
   sending the first symbol, wherein the second signal comprises the first symbol, and
   wherein:
      the second modulation scheme corresponds to quality of a channel between the relay device and the second device; and
      a first constellation diagram and a second constellation diagram comprise a same quantity of constellation points, the first constellation diagram is a constellation diagram corresponding to the first quantization level and the first modulation scheme, and the second constellation diagram is a constellation diagram corresponding to the second modulation scheme.

3. The wireless communication method according to claim 2, wherein the wireless communication method further comprises at least one of the following:
   receiving, by the relay device, first indication information sent by a network device, wherein the first indication information indicates the first modulation scheme; or
   receiving, by the relay device, second indication information sent by the network device, wherein the second indication information indicates the first quantization level.

4. The wireless communication method according to claim 2, wherein the wireless communication method further comprises:
   determining, by the relay device, the first modulation scheme based on the second modulation scheme and the first quantization level; or
   determining, by the relay device, the first quantization level based on the second modulation scheme and the first modulation scheme.

5. The wireless communication method according to claim 1, wherein the sending, by the relay device, a second signal to a second device, the wireless communication method further comprises at least one of the following:
   replacing, by the relay device, a real part of the second symbol with a first threshold when the real part of the second symbol is less than or equal to the first threshold; or
   replacing, by the relay device, an imaginary part of the second symbol with a second threshold when the imaginary part of the second symbol is less than or equal to the second threshold.

6. The wireless communication method according to claim 1, wherein before the sending, by the relay device, a second signal to a second device, the wireless communication method further comprises:
   multiplying, by the relay device, the second symbol and a first coefficient, wherein the first coefficient corresponds to a third modulation scheme; and
   wherein:
      the third modulation scheme corresponds to quality of a channel between the relay device and the second device; or
      the third modulation scheme is configured by a network device.

7. The wireless communication method according to claim 6, wherein:
   the first coefficient is 1 when the third modulation scheme is QPSK modulation;
   the first coefficient is $$\frac{3\sqrt{2}}{\sqrt{10}}$$

when the third modulation scheme is 16-order quadrature amplitude modulation;
   the first coefficient is $$\frac{7\sqrt{2}}{\sqrt{42}}$$

when the third modulation scheme is 64-order quadrature amplitude modulation; or the first coefficient is $$\frac{15\sqrt{2}}{\sqrt{170}}$$

when the third modulation scheme is 256-order quadrature amplitude modulation.

8. The wireless communication method according to claim 7, wherein the first bits comprise an incorrectly decoded bit in the plurality of bits carried in the first signal.

9. The wireless communication method according to claim 8, wherein the wireless communication method further comprises:
sending, by the relay device, a third signal to the second device, wherein the third signal carries a plurality of second bits, and the second bits comprise a correctly decoded bit in the plurality of bits carried in the first signal.

10. The wireless communication method according to claim 9, wherein the first information and the second bits are sent in a cascading manner.

11. The wireless communication method according to claim 10, wherein the wireless communication method further comprises:
receiving, by the relay device, third indication information sent by the network device, wherein the third indication information indicates a sequence of sending the first information and the second bits.

12. The wireless communication method according to claim 9, wherein the first information and the second bits are sent through time division multiplexing or frequency division multiplexing.

13. The wireless communication method according to claim 12, wherein:
the wireless communication method further comprises:
receiving, by the relay device, fourth indication information sent by the network device, wherein the fourth indication information indicates a plurality of resources, and the plurality of resources correspond to the plurality of bits carried in the first signal in a one-to-one manner; and
the sending, by the relay device, a second signal to a second device comprises:
sending, by the relay device to the second device on a resource corresponding to a first bit of the plurality of first bits, the first information corresponding to the first bit.

14. A wireless communication method, comprising:
receiving, by a second device, a first signal sent by a first device, wherein the first signal carries a plurality of bits;
receiving, by the second device, a second signal sent by a relay device, wherein the second signal carries a plurality of pieces of first information, the plurality of pieces of first information correspond to a plurality of first bits in a one-to-one manner, first information corresponding to a first bit of the plurality of first bits is determined by the relay device based on a probability that the first bit is 1 and a probability that the first bit is 0, and the plurality of first bits comprise a part or all of the plurality of bits carried in the first signal;
demodulating, by the second device, the second signal based on a third modulation scheme to obtain the first information, wherein the third modulation scheme comprises a quadrature phase shift keying (QPSK) modulation scheme; and
decoding, by the second device, the first signal and the second signal to obtain the plurality of bits carried in the first signal.

15. The wireless communication method according to claim 14, wherein the wireless communication method further comprises:
demodulating, by the second device, the second signal based on a first quantization level, a first modulation scheme, and a second modulation scheme to obtain the first information, wherein the second signal is generated after performing the following operations on the first information: quantization based on the first quantization level, modulation based on the first modulation scheme, and constellation point mapping based on the second modulation scheme; and
wherein:
the second modulation scheme corresponds to quality of a channel between the relay device and the second device; and
a first constellation diagram and a second constellation diagram comprise a same quantity of constellation points, the first constellation diagram is a constellation diagram corresponding to the first quantization level and the first modulation scheme, and the second constellation diagram is a constellation diagram corresponding to the second modulation scheme.

16. The wireless communication method according to claim 15, wherein the wireless communication method further comprises at least one of the following:
receiving, by the second device, first indication information sent by a network device, wherein the first indication information indicates the first modulation scheme; or
receiving, by the second device, second indication information sent by the network device, wherein the second indication information indicates the first quantization level.

17. The wireless communication method according to claim 15, wherein the wireless communication method further comprises:
determining, by the second device, the first modulation scheme based on the second modulation scheme and the first quantization level; or
determining, by the second device, the first quantization level based on the second modulation scheme and the first modulation scheme.

18. The wireless communication method according to claim 14, wherein the first bits comprise a bit that is incorrectly decoded by the relay device and that is in the plurality of bits carried in the first signal.

* * * * *